United States Patent
Gosselin et al.

(10) Patent No.: US 7,343,376 B2
(45) Date of Patent: Mar. 11, 2008

(54) MANAGEMENT INFORMATION NOTIFICATION TO A MANAGER IN A MANAGEMENT SYSTEM

(75) Inventors: Nicolas Gosselin, Blainville (CA); Edwin Tse, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 329 days.

(21) Appl. No.: 10/849,142

(22) Filed: May 20, 2004

(65) Prior Publication Data
US 2005/0260987 A1  Nov. 24, 2005

(51) Int. Cl.
*G06F 17/30* (2006.01)
*G06F 15/16* (2006.01)
*G06F 13/00* (2006.01)

(52) U.S. Cl. .................. 707/10; 709/202; 719/317
(58) Field of Classification Search ............ 707/1, 707/10, 103 R; 709/202, 203, 223–226; 719/316–318
See application file for complete search history.

(56) References Cited

U.S. PATENT DOCUMENTS

| | | | |
|---|---|---|---|
| 6,006,019 A * | 12/1999 | Takei | 709/224 |
| 6,032,183 A | 2/2000 | Chen et al. | 709/223 |
| 6,393,472 B1 * | 5/2002 | Anerousis et al. | 709/223 |
| 6,735,626 B1 * | 5/2004 | Tezuka et al. | 709/223 |
| 2002/0029266 A1 | 3/2002 | Tse et al. | 709/224 |
| 2002/0029298 A1 * | 3/2002 | Wilson | 709/316 |
| 2003/0050062 A1 * | 3/2003 | Chen et al. | 455/435 |
| 2003/0074393 A1 * | 4/2003 | Peart | 709/203 |
| 2003/0163582 A1 * | 8/2003 | Inoue et al. | 709/238 |
| 2003/0217279 A1 * | 11/2003 | Fuchigami et al. | 713/189 |

OTHER PUBLICATIONS

Kouzou Sakae et al, "A Study on Storing Managed Objects in Object Oriented Database for Local Fiber Optical Networks following Management Information Tree", IEEE 1992, pp. 255-259.*

* cited by examiner

*Primary Examiner*—Uyen Le (57) ABSTRACT

Method and corresponding agent in a management system of a network. At least one manager and the agent have at least one old Management Information Table (MIT) containing Management Information (MI) from network resources. A Management Information Module of the agent gathers Management Information (MI) from the network resources into a current MIT. A Database Handling Module of the agent, following an event, associates one manager to the event, verifies if the associated manager is associated with one old MIT, builds a Management Information Notification (MIN) from at least the current MIT, associates the associated manager with the current MIT, freezes the current MIT into a further old MIT and creates a further current MIT. A Communication Module of the agent further sends the built MIN to the associated manager.

24 Claims, 4 Drawing Sheets

MANAGEMENT INFORMATION NOTIFICATION TO A MANAGER IN A MANAGEMENT SYSTEM

BACKGROUND OF THE INVENTION

1. Field of the Invention

The present invention relates to management information maintenance in a network management system of a telecommunications network.

2. Description of the Related Art

In large telecommunications network, each deployed network resource under management is represented by a software object, or instance, in a network management system. Each instance is a logical representation of its associated deployed network resource. Since the telecommunications network comprises a plurality of deployed network resources, the network management system also comprises a plurality of associated instances.

In order to maintain consistency between the information contained in the instances (logical representations) in the network management system and that contained in the deployed network resources, each instance has the ability to synchronize its state (i.e., values of the instance's attributes) with its associated deployed network resource. For example, when a deployed network resource's state changes, the instance representing that deployed network resource is notified by the deployed resource and the instance updates its state accordingly. A network management application linked to the network management system, instead of accessing directly the deployed network resource, can access the instance representing the deployed network resource to discover the current state of the deployed network resource.

Likewise, instead of sending commands directly to the deployed network resource, the network management application can send commands to the instance of the network management system representing the deployed network resource. The instance is programmed with the ability to accept commands from the network management application and can therefore decode the original command and translate it into a format understood by the deployed network resource before sending the translated command thereto.

In the following discussion, the network management application is referred to as the Manager. The plurality of instances representing the deployed network resources under management is referred to as a Managed Information Base (MIB). Each instance within the MIB is referred to as a Managed Object (MO) instance. Specific state information maintained in each MO is referred to as Management Information (MI) of the MO. The MI of the MO may comprise configuration attributes, operational states, alarms, or any information relevant to the management of the MO. MI may also be used in certain contexts to refer to the collection of all MOs' states within the MIB. The deployed network resources are sometimes referred to as network elements (NEs). The Manager does not interact directly with the NEs, but rather interacts with the MOs either directly or indirectly, via a software component called Agent.

In a large telecommunications network, it may be common that the number of MOs exceeds hundreds of thousands in number. Although the overall network is dynamic in nature, i.e., the individual MO state changes, it is not uncommon that many kinds of MO state information are static or change very infrequently. Examples of static MO information are the operational state (e.g., most of time, the MO state is "in service" and not changed to "out-of-service"), the inventory information such as the hardware serial number or the software version and the relations with neighboring nodes.

The state-of-the-art solution does not recognize, and therefore does not take advantage of this behavior common to deployed networks.

In order to synchronize the MI of the Agent with the MI of the Manager, one prior art solution requires the Manager to obtain the whole network states (i.e. MI) regardless of the network state changes. One problem of this solution is that the Manager has to compare the obtained complete network MI with the old network MI already acquired from previous exchanges and update its old network MI accordingly. This comparison process demands a lot of resources and, thus, can create high processor load, especially when the Manager administers a large telecommunications network. Another problem of the solution is that the Agent has to send the complete network MI including unchanged MI. As it can be readily observed, sending unchanged MI wastes bandwidth between the Manager and the Agent.

Another prior art solution requires the Agent to send only MO MI that has changed during a certain time period. While this avoids sending unchanged MO MI, it also creates further problems such as, for example, sending useless and outdated MO MI changed information. For instance, if a certain NE MI has changed multiple times (e.g. from state-X to state-Y and then to state-Z) during the time period, all state information (e.g. Y and Z) would be sent, even if some of them (e.g. Y) represent useless and outdated information.

Similarly, another prior art solution, instead of using a time period, uses an index created for each modification to the MI maintained in the Agent. The Manager needs to keep track of the last requested record using the index associated thereto and also needs to place a request for each record, one at a time, up until all records are sent from the Agent. As the previously presented solution, useless and outdated MO MI changed information is also exchanged and bandwidth is wasted by multiple requests.

As can be appreciated, there is a need for an improved solution for the exchange of MI between agents and managers in telecommunications network. The present invention provides such a solution.

SUMMARY OF THE INVENTION

A first aspect of the invention is directed to an agent of a management system comprising a current Management Information Table (MIT), a Database Handling Module; and a Communication Module capable of sending the built MIN to the manager.

The current MIT is for storing management Information (MI) received from one or more network resources of the system. The Database Handling Module is for detecting a Management Information Request (MIR) for sending MI to a manager. The Database Handling Module, responsive to the MIR, is capable of building a Management Information Notification (MIN) using MI from at least the current MIT, associating the manager with the current MIT, converting the current MIT into an old MIT; and creating a new current MIT for storing subsequent MI to be received from the one or more network resources, the new current MIT not being associated to any manager.

A second aspect of the invention is directed to a method for maintaining Management Information (MI) in a management system of a network, the management system comprising an agent and a manager and the network comprising a plurality of network resources sending MI to the agent. The method comprises steps of detecting at the agent a Management Information Request (MIR) for sending MI to the manager, associating a current Management Information Table (MIT) of the agent with the manager thereby creating an old MIT associated with the manager, creating a new current MIT for storing subsequent MI to be received from the plurality of network resources, the new current MIT not being associated to any manager and responding to the manager with a MI Notification (MIN) comprising MI from the old MIT. The MIR may be received at the agent from the manager or may be a result of an expiry of a timer of the agent. The MIN may further comprise MI from a second old MIT created prior to the old MIT and not associated to the manager.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

Figure 1:
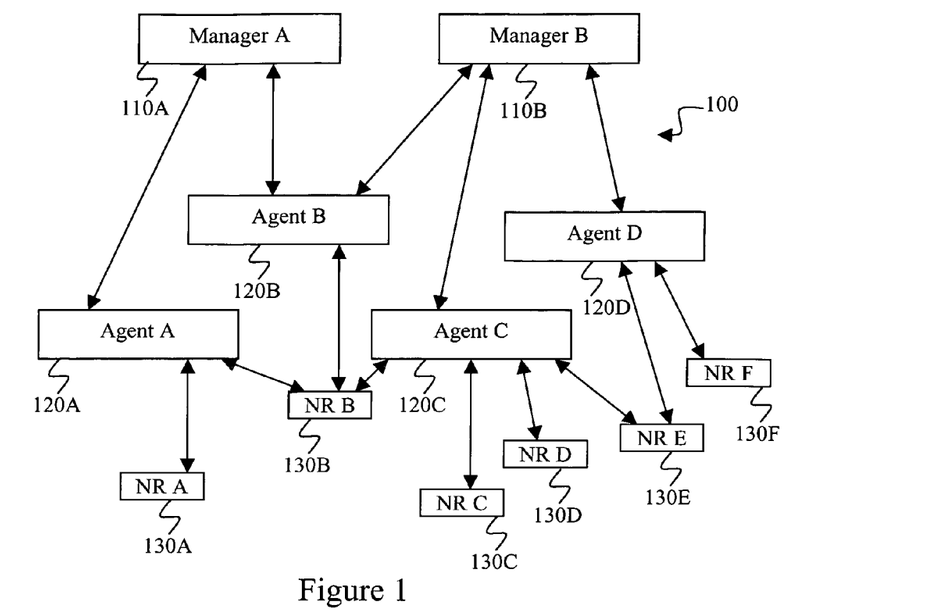
FIG. 1 is an exemplary high level schematic representation of a network deploying a mechanism for maintaining Management Information (MI) in a management system of the network in accordance with the present invention.

Reference is now made to the Drawings wherein FIG. 1 shows a schematic representation of a network 100 deploying a mechanism for maintaining Management Information (MI) in a management system of the network 100 in accordance with the present invention. The management system comprises a plurality of network resources 130A to 130F reporting MI to agents 120A to 120D, which in turn report it to managers 110A and 110B. The mechanism basically enables the agents 120A to 120D and the managers 110A and 110B of the management system to maintain the MI in a more efficient way.

While not being limited thereto, most of the inventive aspects of the present invention reside in the agents 120A to 120D and their way of gathering, maintaining and sending the MI to the manager. For instance, the agents 120A to 120D receiving MI from network resources 130A to 130F gather it in Management Information Tables (MIT) (not shown) and keep track of what MI was sent to managers 110A and 110B by tagging the MI with managers' 110A and 110B identifiers. When further updated MI is to be sent to a given manager, for instance manager A 110A, the manager's A 110A identifier enables the agent to send only the MI that is missing to the target manager A 110A. Only two managers 110A and 110B, four agents 120A to 120D and six network resources 130A to 130 F are shown on FIG. 1. However, it should be readily understood that this only represents an exemplary network 100. Likewise, even though all the managers 110A and 110B and the agents 120A to 120D presented on FIG. 1 are complying with the present invention, it should be understood that this might not be the case in all management systems to which the present invention applies. Furthermore, all network resources 130A to 130F are shown as separate entities on FIG. 1. While this could be the case, it should also be noted that different network resources, e.g. 130C and 130D, could be collocated in a single node of the network 100. There can also be different elements of the management systems in one node such as, for example, the network resource A 130A collocated with the agent A 120A. A more detailed and comprehensive understanding of the present invention will be obtained in the following paragraphs showing further exemplary embodiments thereof.

Figure 2A:
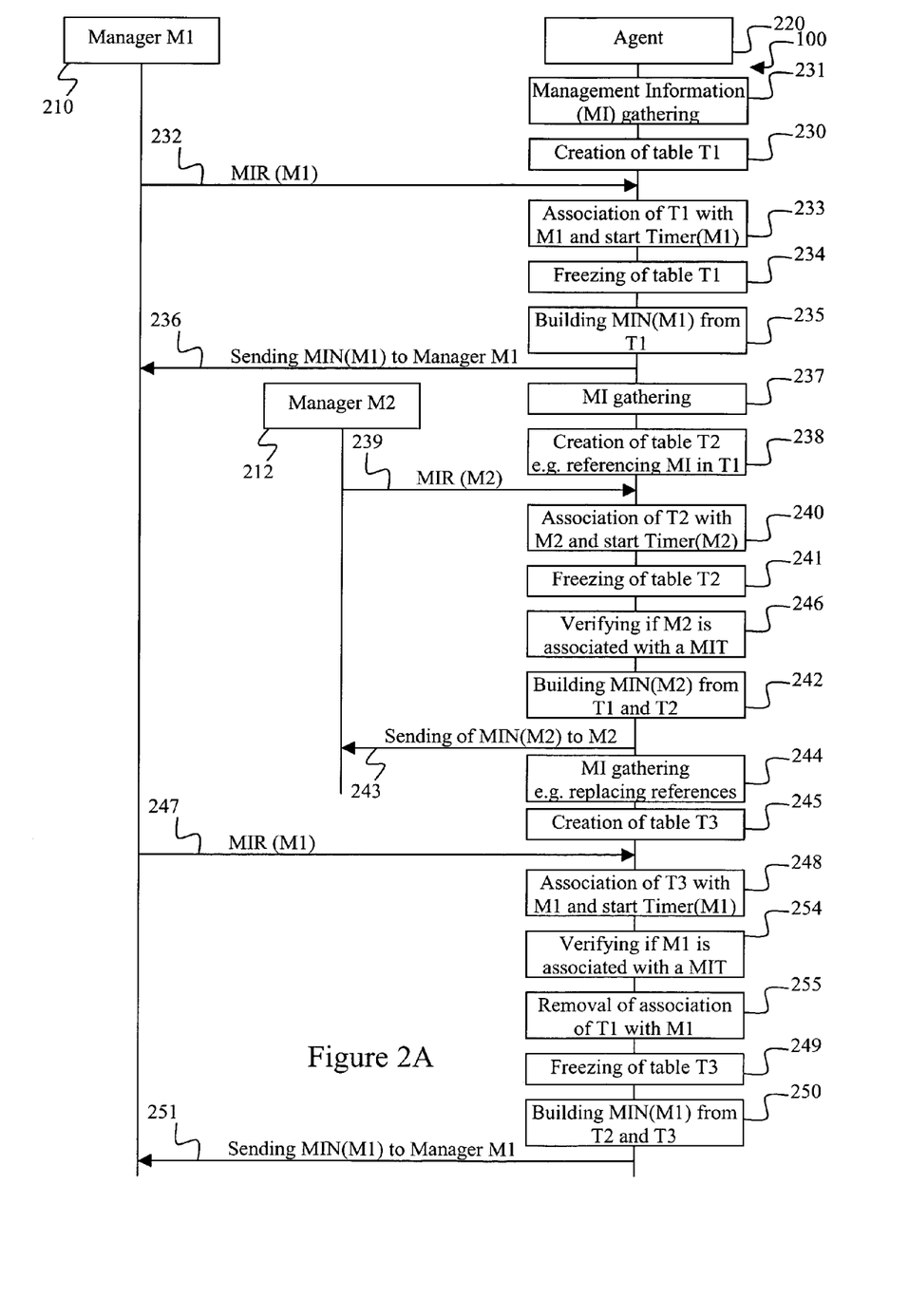
FIG. 2A and FIG. 2B, together referred herein as FIG. 2, are exemplary signal flow and nodal operation charts presenting a method for maintaining MI in a management system of a network in accordance with the present invention.
Figure 2B:
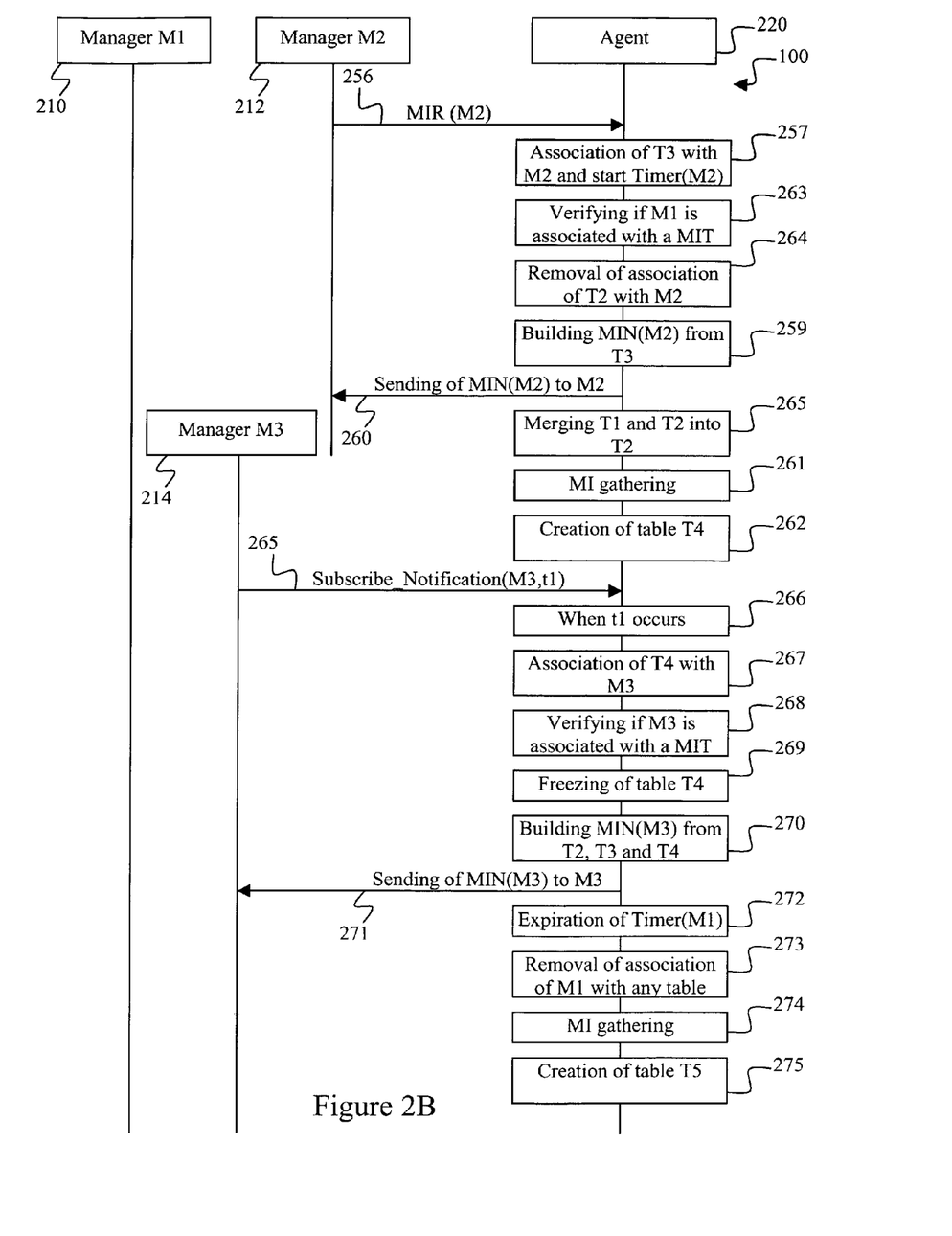

FIG. 2A and FIG. 2B, which can be together referred to as FIG. 2, are exemplary signal flow and nodal operation charts presenting a method for maintaining MI in the management system of the network 100. FIG. 2A presents a manager M1 210, a manager M2 212 and an agent 220. FIG. 2B further presents a manager M3 214. These four nodes are arranged similarly to what is presented on FIG. 1. Network resources 130A to 130F present on FIG. 1 are omitted on FIG. 2 for clarity purposes. Likewise, only one agent 220 is shown in FIG. 2 to limit the complexity of the exemplary embodiment.

In the first exemplary embodiment, it is assumed that the agent 220 is newly added in the network 100, but that basic configuration of the agent 220, of the managers 210-214 and of the network resources is already done. The basic configuration includes, for instance, setting the appropriate information concerning the agent 220 in the network resources so they can report MI thereto (e.g. IP address, management system version or protocol, etc.). It also includes insuring that each of the managers 210-214 to which the agent 220 reports MI has an unambiguous identifier or manager_id. The unambiguous identifiers are used in the invention by the agent 220 to identify the correct one of the managers 210-214 to which MI needs to be sent. In the following example, the managers 210, 212 and 214 respectively have manager_ids equal to M1, M2 and M3.

The method presented in FIG. 2 starts in a state where the agent 220 does not contain any MI. This may be the case following a first power up of the agent 220 or a reset of the MI contained in the agent 220. In such a case, the agent 220 may create a first MIT T1 (step 230) or may wait for MI to be gathered from at least one network resource of the network 100 (step 231) before creating the MIT T1 (step 230). No matter how the MIT T1 was created, the MI gathered in step 231 is stored in the MIT T1, which is, at this point in time of the method of FIG. 2, the current MIT. It should therefore be understood that the order in which steps 230 and 231 are shown on FIG. 2 is for illustrative purposes only and is not limitative of the present invention. Reference is now concurrently made to FIG. 2 and FIG. 3, which shows an exemplary schematic representation of various states of the agent 220 implementing the method presented in FIG. 2 in accordance with the present invention. A first state 231S shown in FIG. 3 corresponds to the state in which the agent 220 is after steps 230 and 231. The first state 231S shows the MIT T1 in a single-line box to which an empty tag is attached. The single-line box represents the MIT T1, which is also the current MIT. The empty tag shows that no manager of the network 100 is associated thereto, as is always the case for the current MIT. The only exception case in which the current MIT could be associated with a manager is for a short transition period if association of step 233 occurs before freeze of step 234 as will be apparent further down with complete explanation of steps 233 and 234.

The MI gathering (step 231) into the MIT T1, or current MIT, continues until a Management Information Request (MIR) containing a manager_id is detected at the agent (step 232). The detection of the MIR in step 232, in the preferred embodiment, is shown in FIG. 2 as a reception of the MIR at the agent, but it could also be the occurrence of a subscription condition, as discussed later on (see step 266). Optionally, it is also possible for the MIR received in step 232 to contain a Timer value associated with the manager MI 210. It should be noted that the step 231 of gathering MI can be a collection of all MI sent from the network resources or a collection of changed MI. Following the reception of the MIR of step 232, the agent 220 associates the current MIT (MIT T1) to the manager M1 210 (step 233) from which, in the present example, the MIR of step 232 originates. The association of step 233 can be performed by extracting the manager_id from the MIR of step 232, which corresponds to M1 210. If the MIR received in step 232 further contains the Timer, or if the particular implementation so requests, the agent 220, while performing the step 233 of associating the MIT T1 with the manager M1 210, starts a timer associated with the manager M1 210 (Timer(M1)). For example, if the manager M1 210 does not request further MI from the agent 220, the Timer(M1) is used to limit the length of time in which an association between the manager M1 210 and the MIT T1 is to be kept by the agent 220. If the manager M1 210 requests further MI, the Timer(M1) is refreshed or reset. In such a context, upon expiration of the Timer(M1), the association between MIT T1 and M1 is removed. The value of Timer(M1) may for example be chosen considering the type of management system, the type of MI reported from the network resources and the hardware resources of the agent 220.

In the preferred embodiment, the agent 220 freezes the MIT TI into a first old MIT (step 234). The MIT T2 thus becomes the current MIT. Freezing the MIT T1 (step 234), in the context of the present invention, means that no newly gathered MI will be entered therein. However, it is optionally possible, while gathering new MI in the current MIT (now MIT T2), to remove outdated MI from any frozen MIT to make better use of resources of the agent 220.

Further to the MIR in step 232, the agent 220 builds a Management Information Notification (MIN) from the MIT T1 for the manager M1 210 (step 235) and sends the MIN(M1) thereto (step 236). Since MIT T1 is the only table of the agent 220, the MIN(M1) is built from all MI contained in the MIT T1. For the same reason, no further verification is formally required before building the MIN(M1), which is not the case when multiple MIT are present in the agent 220, as will be discussed later on.

Following reception of newly gathered, or subsequent MI (step 237), a MIT T2 is created (step 238) by the agent 220. As discussed earlier for steps 230 and 231, the creation of the MIT T2 in step 238 may also precede gathering of new MI. In the preferred embodiment of the present invention, the created MIT T2 is referencing (e.g. by pointers) all the MI of the MIT T1. Depending on the resources of the agent 220, it is also possible for the MIT T2 to be a copy of all the MI contained in MIT T1.

Figure 3:
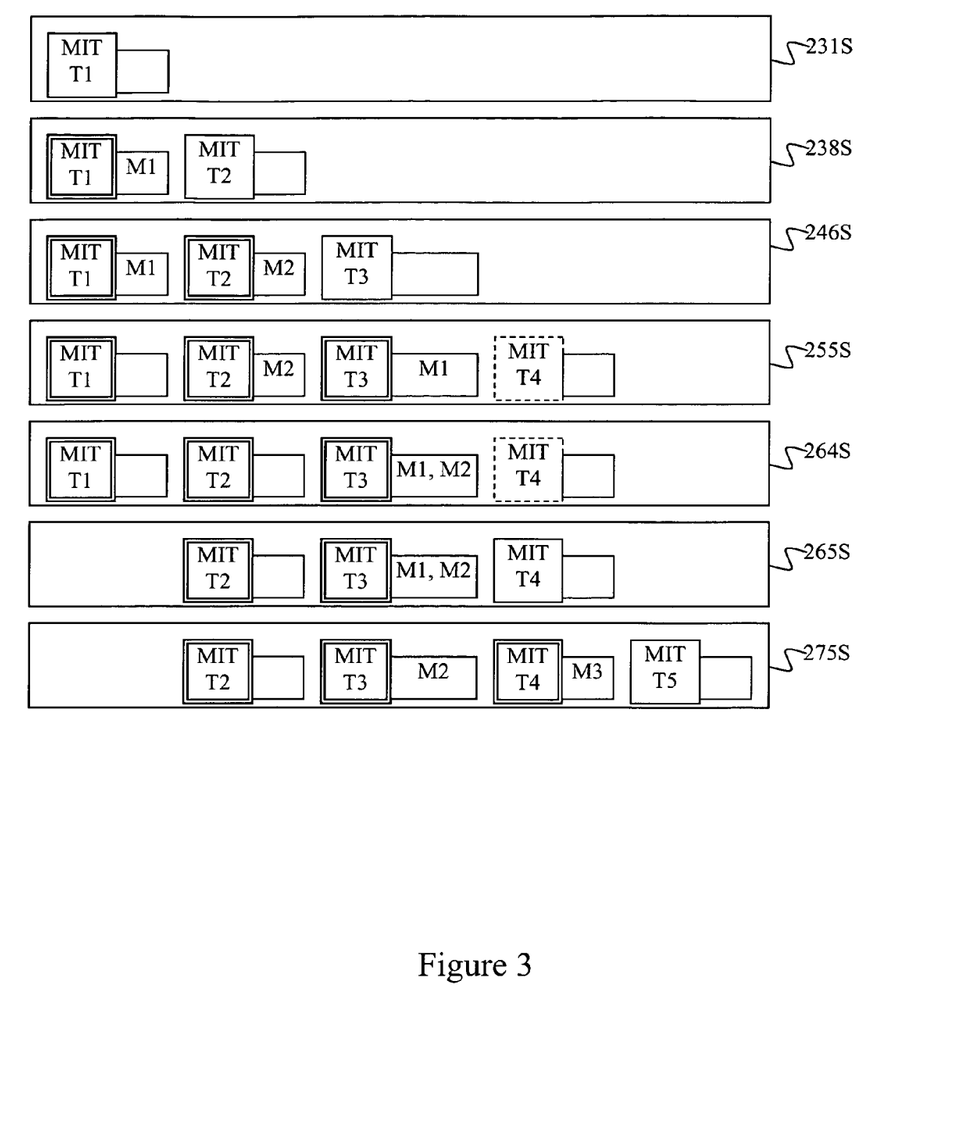
FIG. 3 is an exemplary schematic representation of various states of an agent implementing the method presented in FIG. 2 in accordance with the present invention.

Further to the freeze of the MIT T1 in step 234, MI continues to be gathered by the agent 220 (step 237) in the current MIT, which is at the moment MIT T2. If the MIT T2 contains references to MI from MIT T1 and if the newly gathered MI is to refresh older MI, then the new MI replaces the reference to the old MIT. If the MIT T2 contains a copy of MI from MIT T1 and if the gathered MI is to refresh older MI, then the new MI replaces the local copy of MI. In both cases, since refreshed MI is present in the current MIT, the old MI being refreshed may optionally be deleted from the old MIT, which for instance, makes better use of resources of the agent 220. A second state 238S corresponds to the state in which the agent 220 is after steps 233-235 and 237-238. The second state 238S shows the MIT T1 in a double-line box to which the attached tag is filled with the value M1. The double-line box shows that the MIT T1 is an old MIT, in this particular case the first old MIT. The current MIT shown in a single-line box is now the MIT T2. An empty tag attached to T2 shows that no manager of the network 100 is associated thereto.

As it can be appreciated, steps 233-238 on FIG. 2 could be rearranged in multiple ways. Therefore, the order in which the steps 233-238 are shown should be seen as an example rather than a requirement. Furthermore, it is an optional behavior of the agent 220 to perform all or some of the steps 233-238 in a transaction. The transaction approach is well known in the database field and involve using appropriate locks on the data being modified or updated. This is particularly useful if it can be predicted, for instance, that new MI is likely to be gathered by the agent 220 while a freeze of a MIT is occurring. The transaction thus insures higher integrity of the MI and prevents race conditions (multiple unnecessary changes following update) and other well-known problems associated with badly managed data updates. Defining the transaction approach falls outside the scope of the present invention. An order of steps 233-238 may be preferable to others, even if the transaction approach is not taken. For instance, if step 238 of creating the MIT T2 occurs before steps 237 of gathering MI, 234 of freezing and 233 of associating, then the gathered MI of step 237 can be entered therein without affecting MIT T1, which can then be frozen in step 234 before being associated with M1 in step 233. Thereafter, the agent 220 can build the MIN(M1) from the MIT T1 (step 235) and send (step 236) the MIN(M1) to the manager M1 210. Thereby, the agent 220 responds to the MIR detected in step 232 from the manager M1 210 with the MIN comprising MI from at least one old MIT (in the present case, the MIT T1).

When the agent 220 receives a MIR from the manager M2 212 (step 239), steps 240-245 similar to the steps 233-238 occur in relation to the manager M2 212 and MIT T3 instead of the manager M1 210 and the MIT T2. More explicitly, steps 240-241 are respectively associating the manager M2 212 with the MIT T2 and freezing the MIT T2 into a second old MIT. Since the agent 220 contains the current MIT and at least another MIT (i.e. the first old MIT T1), a step of verifying if the manager M2 212 is already associated with any old MIT of the agent 220 (step 246) is performed (the step 246 can be performed even though only one MIT is present in the agent 200, but is optional in such a case). In the present example, the verification of step 246 shows that the manager M2 212 is not associated with any old MIT. As an example, the verification can be done by looking for the manager_id M2 in an association table comprising each MIT and all respective associated manager(s). Since there is more than one MIT in the agent 220 and that the manager M2 212 is not associated with any of the old MIT, the step of building the MIN(M2) 242 comprises retrieving all MI contained in the agent 220. If the current MIT (MIT T2) contains references to MI from the first old MIT, retrieving all the MI contained in the agent 220 comprises retrieving the MI referenced in the current MIT from the first old MIT T1 and placing it in the MIN(M2) as well as placing all MI from the current MIT in the MIN(M2). If the current MIT (MIT T2) contains a copy of the MI from the first old MIT, retrieving all the MI contained in the agent 220 comprises placing all MI from the current MIT in the MIN(M2). The step 243 of sending the MIN(M2) is also performed.

A third state 246S corresponds to the state in which the agent 220 is after steps 240-246. The third state 246S shows the first old MIT T1 and the second old MIT T2 in double-line boxes, each being respectively associated, via their tags, to the manager M1 210 and the manager M2 212. The single-line box shows that the MIT T3 is the current MIT.

When the agent 220 receives a new MIR from the manager M1 210 (step 247), steps 248-251 and 254 similar to the steps 240-243 and 246 occur in relation to the manager M1 210 instead of the manager M2 212. The agent 220 contains the current MIT, the first old MIT T1 and the second old MIT T2. Consequently, the step of verifying if the manager M1 210 is already associated with any old MIT of the agent 220 (step 254) is performed. In the present example, the verification of step 254 shows that the manager M1 210 is associated with the first old MIT T. Since the manager M1 210 is associated with the first old MIT T1 upon reception of the MIR of step 247, removal of the prior association (step 255) is necessary before or concurrently to the step 248 of associating the manager M1 210 with the MIT T3. The step 248 should be done carefully, making sure it does not interfere with further step 250 of building the MIN (M1) since the step 250 uses the association of the manager M1 210 valid at the moment where the MIR of step 247 is received at the agent 220. For instance, the removal of step 255 may further include buffering the information concerning the previous association thereby removed for further reference by the agent 220 while building the MIN (M1) in step 250. Since there is more than one MIT in the agent 220 and that the manager M1 210 is associated, upon reception of the MIR of step 247, with the first old MIT T1, the step of building the MIN(M1) 250 comprises retrieving all MI contained in the agent 220 that was not already sent to the manager M1 210 in a previous MIN. In other words, the step of building the MIN(M1) 250 comprises retrieving all MI contained in all MIT that were created after the first old MIT T1 (MIT newer than MIT T1) since the manager M1 210 is associated thereto. Therefore, if the current MIT (MIT T3) contains references to MI from the first old MIT and the second old MIT T2, retrieving all the MI contained in the agent 220 that was not already sent to the manager M1 210 comprises retrieving the MI referenced in the current MIT from the second old MIT T2 and placing it in the MIN(M1) as well as placing all MI from the current MIT in the MIN(M1). Note that the MI referenced from the first old MIT is not placed in the MIN(M1) since, as mentioned, it was already sent in a previous MIN. If the current MIT (MIT T3) contains a copy of the MI from the first old MIT T1, retrieving all the MI contained in the agent 220 comprises placing all MI from the current MIT that is not contained in the first old MIT T1 in the MIN(M1). A comparison between the current MIT and the first old MIT T1 may thus be necessary so that only the difference is placed in the MIN (M1). The steps 249 and 251 respectively of freezing the MIT T3 into a third old MIT and sending the MIN(M1) to the manager M1 210 are also performed.

A fourth state 255S corresponds to the state in which the agent 220 is after steps 247-255. The fourth state 255S shows the first old MIT T1, the second old MIT T2, the third old MIT T3 in double-line boxes, the two last being respectively associated, via their tags, to the manager M2 212 and the manager M1 210. The first old MIT T1 is not associated with any manager. A further MIT T4 is shown in a dashed single-line box since it may or not be present, depending on the way the agent 220 gathers MI. If a new MIT is created automatically when the current MIT is frozen (e.g. step 234, 241, 249), then the MIT T4 is present and is the current MIT in the agent 220 in the fourth state 255S. If new MI needs to be gathered before creating a new MIT to become the current MIT, then the MIT T4 is not yet present and there is no current MIT in the fourth state 255S.

A new MIR from the manager M2 212 is then received in the agent 220 at step 256. As it can be appreciated, no new MI is gathered by the agent 220 between the step 249 of freezing and the step 256. The agent 220 contains the first old MIT T1, the second old MIT T2 and the third old MIT T3. The agent 220 may further comprise a current MIT T4 created following the step 249 of freezing. It is also possible that no current MIT be present at this point since no new MI is gathered and that the agent 220 may wait for new MI to be gathered before creating the MIT T4. Consequently, the step of verifying if the manager M2 212 is already associated with any old MIT of the agent 220 (step 257) is performed. In the present example, the verification of step 257 shows that the manager M2 212 is associated with the second old MIT T2. Since the manager M2 212 is associated with the second old MIT T2 upon reception of the MIR of step 256, removal of the prior association (step 264) is necessary before or concurrently to step 257 of associating the manager M2 212 with the MIT T3. The step 264 should be done with care, making sure it does not interfere with further step 259 of building the MIN(M2) since the step 259 uses the association of the manager M2 212 valid at the moment where the MIR of step 256 is received at the agent 220. Since there is more than one MIT in the agent 220 and that the manager M2 212 is associated, upon reception of the MIR of step 226, with the second old MIT T2, the step of building the MIN(M2) 259 comprises retrieving all MI contained in the agent 220 that was not already sent to the manager M2 212. In other words, the step of building the MIN(M2) 259 comprises retrieving all MI contained in all MIT that were created after the second old MIT T1 (MIT newer than MIT T2) since the manager M2 212 is associated thereto. Therefore, since the current MIT (MIT T4) is either empty or not existing in the agent 220, the third old MIT T3 should be used as the starting point for building the MIN (M2) in step 259. If the third old MIT T3 contains references to MI from the first old MIT and the second old MIT T2, retrieving all the MI contained in the agent 220 that was not already sent to the manager M1 210 comprises retrieving the MI referenced in the third old MIT T3 only and placing it in the MIN(M2). Note that the MI referenced from the first old MIT and the second old MIT T2 is not placed in the MIN(M2). If the third old MIT T3 contains a copy of the MI from the first old MIT T1 and the second old MIT T2, retrieving all the MI contained in the agent 220 comprises placing all MI from the third MIT T3 that is not contained in the first old MIT T1 and not contained in the second MIT T2 in the MIN(M2). The step 260 of sending the MIN(M2) to the manager M2 212 is also performed. There is no step of freezing the current MIT in the present case since the current MIT is either empty or not present in the agent 220.

A fifth state 264S corresponds to the state in which the agent 220 is after steps 256-260, 263 and 264. The fifth state 264S shows the first old MIT T1, the second old MIT T2, the third old MIT T3 in double-line boxes, the third old MIT T3 being associated, via its tag, to the manager M2 212 and the manager M1 210. The first old MIT T1 and the second old MIT T2 are not associated with any manager. A further MIT T4 is shown in a dashed single-line box since it may or not be present, depending on the way the agent 220 gathers MI. If a new MIT is created automatically when the current MIT is frozen (e.g. step 234, 241, 249), then the MIT T4 is present and is the current MIT in the agent 220 in the fifth state 264S. If new MI needs to be gathered before creating a new MIT to become the current MIT, then the MIT T4 is not present and there is no current MIT in the fifth state 264S.

As shown in the fifth state 264S, two consecutives old MIT are not associated with any manager of the network 100. The MI contained in the first old MIT T1 will never be used as such, but always together with the MI of the second old MIT T2. Indeed, it can be seen from the previous examples that relevant MI for a given manager is to be found in MIT created before a given MIT with which the given manager is associated. Therefore, in the case of the state shown in the fifth state 264S, the first and the second old MIT T2 can optionally be merged to better manage the resources of the agent 220.

Upon gathering of new MI (step 261), a current MIT is created as MIT T4 (step 262) or the previously created MIT T4 is used as the current MIT to store the gathered information. A sixth state 265S corresponds to the state in which the agent 220 is after steps 261, 262 and 265. The sixth state 265S shows the second old MIT T2 and the third old MIT T3 in double-line boxes, the third old MIT T3 being associated, via its tag, to the manager M2 212 and the manager M1 210. The second old MIT T2 is not associated with any manager. The MIT T4 is present and is the current MIT in the agent 220.

Thereafter, a Subscribe_Notification is received at the agent 220 from the manager M3 214 (step 265). The Subscribe_Notification is used by the manager M3 214 to subscribe to notifications semantically identical to the MIN shown previously, but sent following a registration condition, such as a time condition or network condition, instead of following reception of a MIR by the agent 220. Thus the Subscribe_Notification contains the identifier (manager_id) of the manager M3 214 and the registration condition as mentioned above. Example of the registration condition include a fixed execution time each day, a timer for notification every hour or 38 minutes and a condition on update of MI from one of the plurality of network resources.

Once the registration condition specified in the Subscribe_Notification of step 265 occurs (step 266), a step of verifying if the manager M3 214 is already associated with any old MIT of the agent 220 (step 268) is performed. The step 266 can be assimilated to reception of an MIR from the manager M3 214 (not shown) since it triggers the same actions. In the present example, the manager M3 214 is not associated to any old MIT of the agent 220. The manager M3 is then associated with the current MIT (MIT T4) (step 267) and the current MIT is frozen into the fourth old MIT T4 (step 269). An MIN(M3) is then built (step 270) taking into account all MI contained in the agent 220 since the manager M3 is not associated to any old MIT. The MIN (M3) is then sent (step 271) to the manager M3 214.

As mentioned earlier, the Timer(M1) may be used by the agent upon reception of the Timer in the MIR of step 233. If the Timer (M1) is used, it may expire if no MIN is sent (through MIR or subscription) to the manager M1 210 before expiration thereof. If expiration occurs as in step 272, any association of the manager M1 with any old MIT of the agent 220 is removed (step 273). In the present example, the step 273 removes M1 from association with the third old MIT T3.

Further MI is gathered by the agent 220 (step 274) and placed in a MIT T5 created upon gathering of the MI of step 274 or after freezing of the fourth old MIT T4 in step 269 (step 275). A seventh state 275S corresponds to the state in which the agent 220 is after steps 266-275. The seventh state 275S shows the second old MIT T2, the third old MIT T3 and the fourth old MIT T4 in double-line boxes, the third old MIT T3 and the fourth MIT T4 being respectively associated, via their tag, to the manager M2 212 and the manager M3 214. The second old MIT T2 is not associated with any manager. The MIT T5 is present and is the current MIT in the agent 220.

Figure 4:
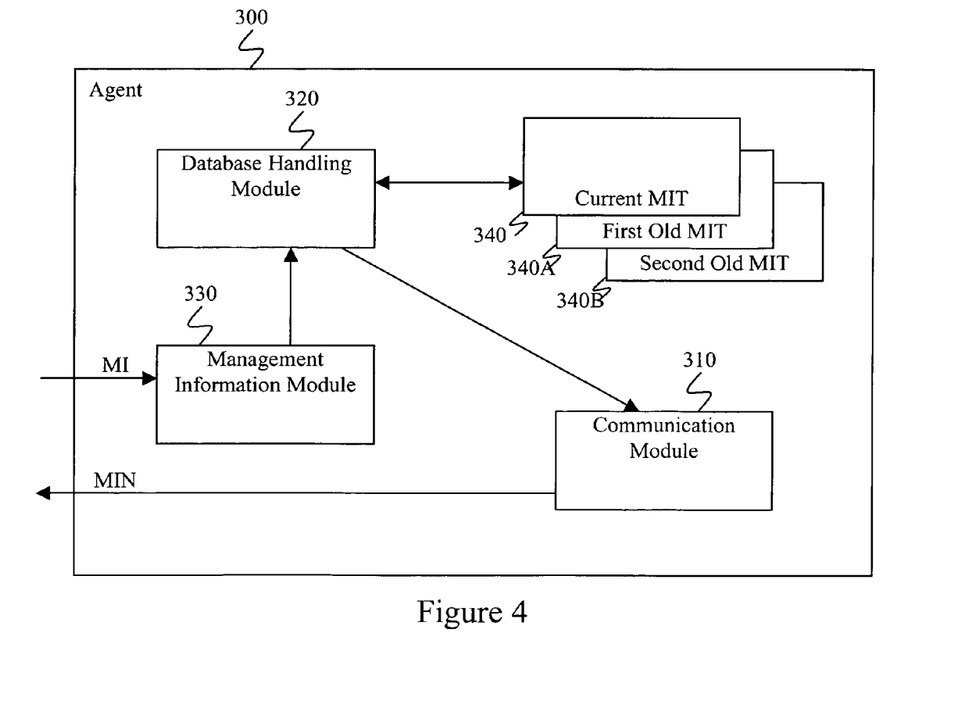
FIG. 4 is a modular representation of an agent providing capabilities to maintain Management Information (MI) in a management system of a network in accordance with the present invention.

Reference is now made to FIG. 4, which is a modular representation of the agent 300 providing capabilities to maintain MI in the management system of the network 100. The agent 300 presented in FIG. 4 is a generalization of the agent 220 previously presented in FIGS. 2 and 3. The network 100, as mentioned earlier, comprises a plurality of network resources and at least one manager. The agent 300 comprises a Management Information Module 330, a Database Handling Module 320, a Communication Module 310 and a current MIT 340. The agent further comprises a first and second old MIT 340A and 340B containing MI previously gathered by the agent 300*a* s discussed earlier.

The Management Information Module 330 of the agent 300 is capable of gathering MI from at least one of the plurality of network resources into the current MIT 340 as discussed previously with particular reference to FIGS. 2 and 3. An incoming arrow illustrates the gathering of MI into the agent 300 toward the Management Information Module 330.

The Database Handling Module 320 of the agent 300 is capable of, following an event at the agent, associating one of the at least one manager to the event, the one of the at least one manager being thereafter referred to as the associated manager, verifying if the associated manager is associated with one old MIT 304A or 340B, building a MIN from at least the current MIT 340 taking into account or using a result of the verification of association performed previously, associating the associated manager with the current MIT 340, freezing the current MIT 340 into a further old MIT (not shown) and creating a further current MIT (not shown). The Database Handling Module 320 may fetch MI in the current MIT 340 and, possibly, in the old MIT 340A and 340B for building the MIN. Likewise, the Database Handling Module 320 stores, if necessary, MI received within the agent 300 from the Management Information Module 330 in the current MIT 340 or the further current MIT. Both fetching and storing behaviors are presented on FIG. 4 by a double arrow between the MIT 340, 340A and 340B and the Database Handling Module 320.

The Communication Module 310 of the agent 300 is capable of sending the built MIN to the associated manager. The built MIN is received, within the agent 300, from the Database Handling Module 320. An outgoing arrow illustrates the sending of the MIN from the agent's 300 Communication Module 310 to the associated manager.

Optionally, the agent 300, through its the Database Handling Module 320, while building the MIN taking into account the verification, is further capable of identifying one of the old MIT 340A and 304B as being associated with the associated manager, the one of the at old MIT 340A or 340B being thereafter referred to as the identified MIT and placing all MI from all the MIT of the agent that were created after the creation of the identified MIT in the MIN. This is similar to steps 267, 268 and 270 previously presented.

The event discussed earlier can optionally be associated to reception of a MIR at the agent 300 from the at least one manager and, in such circumstances, the Database Handling Module 320 would further be capable of associating one of the at least one manager to the event by extracting a manager_id from the MIR.

Likewise, the event discussed earlier can optionally be associated to an occurrence of a registration condition, which registration condition is set by a reception at the agent 300 of a Subscribe_Notification from a manager. The registration condition may comprise a time condition such as fixed execution at one time every day or repetitive execution, for example, every hour or 83 minutes or a network condition such as an update of one of the plurality of network resources. The Database Handling Module 320 would, in such cases, be further capable of associating one of the at least one manager to the event by extracting a manager_id from the Subscribe_Notification.

Optionally, the agent 300 through its the Database Handling Module 330 may further be capable of creating the further current MIT following reception of new MI from at least one of the plurality of network resources. The further current MIT may also be created automatically, knowing that MI will be received later one at the agent 300.

In an optional behavior of the agent 300, the Database Handling Module 320 may also be further capable of removing prior association of the associated manager with any old MIT 340A or 304 B of the agent before or concurrently to the association of the at least one manager to the current MIT 340. In order to avoid race condition or data mismatch, the Database Handling Module 320 of the agent 300 may optionally perform association of the manager with the current MIT 340 and removal of prior association of the manager with any old MIT 340A or 340B of the agent 300 in a transaction.

The Database Handling Module 320 of the agent 300 may also create the further current MIT by referencing the content of the further old MIT into the further current MIT. Such an optional behavior can also be called shallow copy, reference copy or shine through copy.

In order to save resources in the agent 300 (e.g. disk or memory space) the Database Handling Module 320 may optionally, following freezing the current MIT 340 into the further old MIT, gather further MI in the further current MIT and remove, while doing so, outdated MI from any old MIT 340, 340A or 340B. If such is the case, the Database Handling Module 320 of the agent 300 may further be capable of removing any old MIT 340, 340A and 340B from the agent if it is completely emptied and not associated with any manager.

The agent 300, through the Database Handling Module 320 may optionally merge two of at least one old MIT 340A and 340B together if the two MIT are consecutive (e.g. created one after the other at different time, but consecutively by the agent) and not associated with any manager.

Finally, the agent 300 may optionally, after associating the associated manager with the current MIT 340, start a timer associated with the associated manager and remove the association between the associated manager and any MIT of the agent upon expiration of the timer.

The innovative teachings of the present invention have been described with particular reference to numerous exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

What is claimed is:

1. An agent of a management system, the agent comprising:
   a memory;
   a current Management Information Table (MIT) for storing, using the memory, management Information (MI) received from one or more network resources of the system;
   a Database Handling Module for detecting a Management Information Request (MIR) for sending MI to a manager, and responsive to the MIR, the Database Handling Module:
      builds a Management Information Notification (MIN) using MI from at least the current MIT;
      associates the manager with the current MIT;
      converts the current MIT into an old MIT; and
      creates a new current MIT for storing subsequent MI to be received from the one or more network resources, the new current MIT not being associated to any manager; and
   a Communication Module that:
      sends the built MIN to the manager.

2. The agent of claim 1 further comprising a further old MIT created before the old MIT and wherein the Database Handling Module further:
   prior to associating the manager with the current MIT, performs a verification to determine if the manager is associated with a further old MIT of the agent; and
   builds the Management Information Notification (MIN) using MI from at least the current MIT using a result of the verification.

3. The agent of claim 2 wherein the Database Handling Module, while building the MIN using a result of the verification further:
   identifies the further old MIT as being associated with the manager; and
   places all MI stored in the agent after the creation of the further old MIT associated with the manager in the MIN.

4. The agent of claim 2 wherein the Database Handling Module, while building the MIN using a result of the verification further:
   identifies the further old MIT as not being associated with the manager; and
   places all MI stored in the agent in the MIN.

5. The agent of claim 1 wherein the Database Handling Module detects the MIR by reception of an MIR message from the manager and wherein the Database Handling Module further associates the manager to the MIR message by extracting a manager_id there from.

6. The agent of claim 1 wherein the Database Handling Module detects the MIR upon occurrence of a registration condition wherein:
   the registration condition defined by a Subscribe_Notification sent from the manager to the agent;
   the registration condition comprises one condition selected from the group of conditions consisting of a time condition and a network condition; and the Database Handling Module further associates the manager to the MIR by extracting a manager_id from the Subscribe_Notification.

7. The agent of claim 1 wherein the Database Handling Module further creates the new current MIT following reception of new MI from one or more network resources.

8. The agent of claim 1 wherein the Database Handling Module further removes prior association of the manager with any MIT of the agent.

9. The agent of claim 1 wherein the Database Handling Module further creates the new current MIT by referencing the content of the old MIT into the new current MIT.

10. The agent of claim 1 wherein the Database Handling Module further, following converting the current MIT into the old MIT, gathers, using the memory, further MI in the new current MIT and removes outdated MI from any other MIT.

11. The agent of claim 10 wherein the Database Handling Module further removes from the agent an empty MIT that is not associated with any manager of the system.

12. The agent of claim 1 wherein the Database Handling Module further:
   after associating the manager with the current MIT, starts a timer associated with the manager; and
   removes the association between the manager and any MIT of the agent upon expiry of the timer.

13. The agent of claim 1, wherein the memory is a disk or memory space.

14. The agent of claim 1, wherein the memory is used to store at least a portion of the current MIT and the new current MIT.

15. The agent of claim 1, wherein the memory is used to store at least a portion of the MIN before being sent.

16. A method for handling Management Information (MI) in a management system of a network, the management system comprising an agent and a manager, and the network comprising a plurality of network resources sending MI to the agent, the method comprising steps of:
   a. detecting at the agent a Management Information Request (MIR) for sending MI to the manager;
   b. associating a current Management Information Table (MIT) of the agent with the manager thereby creating an old MIT associated with the manager;
   c. creating a new current MIT for storing subsequent MI to be received from the plurality of network resources, the new current MIT not being associated to any manager; and
   d. responding to the manager with a MI Notification (MIN) comprising MI from the old MIT.

17. The method of claim 16 wherein the MIR is received at the agent from the manager.

18. The method of claim 16 wherein the MIR is a result of an expiry of a timer of the agent.

19. The method of claim 16 wherein the MIN further comprises MI from a second old MIT, wherein the second old MIT was created prior to the old MIT and is not associated to the manager.

20. The method of claim 16 further comprising the step of:
   e. removing a prior association between the manager and a second old MIT upon responding to the manager with the MIN.

21. The method of claim 16 wherein the MIN comprises MI that is received by the agent from one or more of the network resources after a previous MIN sent from the agent to the manager.

22. The method of claim 16 wherein the step c. of creating the new current MIT is performed responsive to a receipt of MI from at least one of the plurality of network resources.

23. The method of claim 16 wherein the step c. of creating the new current MIT is performed by referencing the content of the old MIT into the new current MIT.

24. The method of claim 23, wherein upon receipt of new MI from a network resource by the agent, the new MI replaces a reference to the old MIT within the new MIT.

* * * * *